3,535,401
OLEFIN CONVERSION PROCESS
Nissim Calderon and Hung Yu Chen, Akron, Ohio, assignors to The Goodyear Tire & Rubber Company, Akron, Ohio, a corporation of Ohio
No Drawing. Continuation-in-part of application Ser. No. 549,192, May 11, 1966. This application Jan. 18, 1967, Ser. No. 610,014
Int. Cl. C07c 3/62
U.S. Cl. 260—683                 11 Claims

ABSTRACT OF THE DISCLOSURE

A catalytic reaction leading to certain skeletal and configurational transformations in unsaturated compounds is provided by the novel olefin-metathesis process. The reaction comprises converting unsaturated compounds corresponding to the general formula:

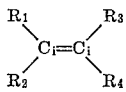

by a unique interchange process of constituent groups into other unsaturated compounds corresponding to the formula:

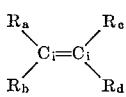

wherein: (1) the number of hydrogens attached to any given $C_i$ carbon in the reactants is equal to the number of hydrogens attached to the same $C_i$ carbon in the products; (2) $R_a$, $R_b$, $R_c$ and $R_d$ in the products must be selected from the group consisting of $R_1$, $R_2$, $R_3$ and $R_4$ of the reactants; and (3) at least one of the $R_a$, $R_b$, $R_c$ and $R_d$ is a group other than hydrogen.

---

The olefin-metathesis reaction is carried out in the presence of catalysts comprising: (A) organometallic compounds, such as organoaluminum; (B) transition metal derivatives, such as tungsten halides, and (C) oxygen containing compounds, such as alcohols.

The olefin-metathesis process is conducted either in the presence or absence of solvents and can be carried out at high or low temperatures. The reaction provides a method for altering the number of carbons of unsaturated compounds at extremely mild temperature and pressure conditions.

This application is a continuation-in-part of application Ser. No. 549,192, filed May 11, 1966, now abandoned.

The present invention relates to a novel method for synthesis of chemical compounds containing at least one olefinic carbon-to-carbon double bond, hereinafter referred to as unsaturated compounds. The invention is also directed to a new catalytic process whereby unsaturated compounds undergo a novel metathesis reaction, under extremely mild temperature and pressure conditions, resulting in the formation of new and useful unsaturated compounds. The term "olefin-metathesis" or "metathesis" when used throughout this application is intended to designate the novel reaction whereby unsaturated compounds undergo certain skeletal, configurational, or both certain skeletal and configurational transformations by a unique interchange of similar or dissimilar constituent groups between different double bonds, said double bonds being in the same or in different unsaturated molecules. The nature of the olefin-metathesis process may be easily described by the stoichiometric formula for a typical example of this reaction:

2A—CH=CH—B → A—CH=CH—A + B—CH=CH—B

Thus, for example, 2 moles of octene-2, $CH_3CH=CH—C_5H_{11}$ will undergo such a metathesis to form 1 mole of butene-2, $CH_3—CH=CH—CH_3$, and 1 mole of dodecene-6, $C_5H_{11}—CH=CH—C_5H_{11}$. However, the detailed mechanism of the process is not fully understood.

Notwithstanding the fact that several mechanisms can be suggested and the experimental results, which are included later in the specification, do not provide an unequivocal support of any single mechanistic scheme, the teachings of the present specification clearly demonstrate the scope of the invention.

Heretofore, it has been known that catalysts comprising of organo-metallic compounds in combinations with transition metal halides, known also as Ziegler-Natta coordination catalysts, are active in promoting the polymerization of alpha olefins and diolefins. In general, these polymerizations take place by the well-known addition polymerization mechanism where olefinic double bonds in the alpha olefins and diolefins monomers are converted to single bonds in the polymers. Attempts to homo-polymerize internal olefins (olefins which have no more than one hydrogen attached to each of the carbons forming the olefinic double bonds) by the single addition polymerization scheme using Ziegler-Natta coordination catalyst, have met with little success.

In the present invention, two types of olefin-metathesis reactions will be described.

(a) Homo-metathesis, when one unsaturated compound is exposed to the olefin-metathesis catalyst described hereinafter and at least one new unsaturated product is produced due to the said olefinic-metathesis process, and (b) Cross-metathesis, when a mixture of at least two unsaturated compounds is exposed to the said olefin-metathesis catalyst, and as a result of the interchange of groups between the double bonds of this mixture of unsaturated compounds at least one new product is obtained. Further explanation of the concepts of homo-and cross-metathesis are given elsewhere in this application.

In the present invention, a configurational transformation is regarded as the conventional cis-trans isomerization of olefins. A skeletal transformation in the present invention is regarded as a process whereby an unsaturated compound, or a mixture of unsaturated compounds undergoes an interchange process leading to an unsaturated compound, or a mixture of unsaturated compounds for which all of the substituent groups attached to the double bond, or double bonds, were present originally as substituent groups attached to the double bond, or double bonds, of the starting unsaturated compound, or the mixture of starting unsaturated compounds.

It has been discovered, in accordance with the present invention, that olefins undergo a novel transformation, referred to herein as olefin-metathesis, in the presence of a new catalyst system which will be extensively described later, which leads to the formation of new and useful unsaturated compounds. A typical olefin-metathesis reaction can be easily described by the following equation:

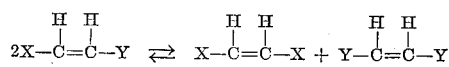

If X and Y represent identical radicals or groups notwithstanding the fact that the described metathesis reaction does take place, it will not cause any skeletal changes leading to the formation of new compounds as I, II and III are equivalent to each other. However, if X and Y represent dissimilar radicals or groups, I, II and III are not equal to each other and two new olefins will be formed from I. For example, when X=methyl and Y=ethyl, the olefin-metathesis reaction will lead to the formation of two new unsaturated compounds.

It is conceivable that the olefin-metathesis reaction of this invention, which is formulated in the equation above proceeds by several mechanistic routes.

Route 1 may be an intermolecular exchange of the constituent groups equivalent to the X and Y. Accordingly:

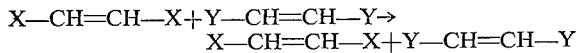

By this route a given group attached to the double bond of a precursor unsaturated molecule is disengaged from the carbon which is attached to a second carbon by the double bond, and transferred to another carbon which is attached to a second carbon by a double bond. By repeating this metathesis process an equilibrium mixture of I, II and III can be reached. Route 1 contemplates the retention of the carbons which form the double bonds throughout the metathesis process, and the reaction is essentially a process of transalkylation.

Route 2 may be an intermolecular exchange of the constituent groups equivalent to the X—CH= and Y—CH= which are attached to each other by double bonds. Accordingly:

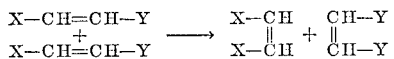

By Route 2 the olefin-metathesis process occurs via cleavage of both bonds which constitute the carbon-to-carbon double bond and a metathesis of alkylidene groups takes place. By Route 2 the carbons which constitute the original double bonds, being an integral part of the interchangeable constituent groups will end in different double bonds.

Route 3 may be a simultaneous intermolecular exchange or groups equivalent to X+H and of groups equivalent to Y+H. Accordingly:

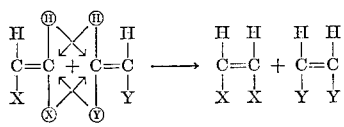

By this route a simultaneous transfer to two substituents attached to a given carbon which is attached to a second carbon by a double bond (X and H or Y and H) takes place and as in Route 1 the carbons which form the original double bonds are retained throughout the metathesis process.

It is understood that the nature of the interchanging constituent groups in Route 1 is different than in Route 2 or Route 3. Some experimental results support Route 1, for instance, Example 6, while other results support Routes 2 or 3, for instance, Example 7, thus, prohibiting an exact definition of the interchanging groups in the olefin-metathesis process.

It is probably that mechanisms much more complicated than those suggested by Routes 1, 2 or 3 above are actually operating but experimental results obtained so far are consistent with the overall stoichiometries suggested by at least one of these routes. For the symetrically di-substituted olefins used in the above equations, Routes 1, 2 or 3 predict the same reaction products. For the special case of asymetrically substituted olefins, Route 1 will commonly predict a different set of products for a reaction than would be predicted for by Routes 2 or 3.

In the specific example described above, two molecules of pentene-2 (I) will disproportionate to form butene-2 (II) and hexene-3 (III). Thus, this reaction is an example of what is defined herein as homo-metathesis. Although the net result of the reaction described above is a disproportionation of two $C_5$ olefin molecules into a $C_4$ olefin and a $C_6$ olefin the scope of the olefin-metathesis reaction is far broader than this disproportionation. If a mixture of two or more olefins is exposed to these new olefin-metathesis catalysts and both have dissimilar groups attached to their respective double bonds, a case which is defined here as a cross-metathesis, a long list of new compounds will be formed due to the numerous interchanges of groups which are possible.

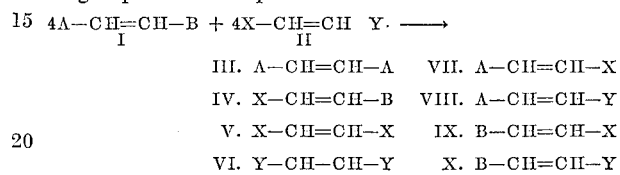

The novel olefin-metathesis reaction, therefore, when carried out on mixtures of unsaturated compounds containing double bonds, will lead to a spectrum of new olefins. However, note that the new products, III through X, formed contain only substituents which were originally present in I and II.

It has been discovered that the olefin-metathesis reaction described hereinabove also induces a cis-trans isomerization of the double bonds involved. For example, the compound cis-hexene-3 with similar ethyl radicals on each side of the double bond, according to the scheme described above, should yield no olefins having a shorter or longer carbon skeleton and does not, but instead will isomerize into a mixture of cis- and trans-hexene-3. Thus, olefin-metathesis causes configurational transformation without a skeletal change in this case.

Unsaturated compounds that may undergo the olefin-metathesis reaction in accordance with this invention are numerous. A general formula which represents these compounds is:

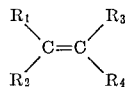

wherein $R_1$, $R_2$, $R_3$ and $R_4$ may be at least one member of the group consisting of alkyl, aryl, alkenyl, alkaryl, arylalkyl, cycloalkyl, cycloalkenyl radicals and hydrogen and at least one of said $R_1$, $R_2$, $R_3$ and $R_4$ must be at least one member of the group of aryl or R'—$CH_2$— wherein R' may be at least one member of the group of alkyl, aryl, alkenyl, alkaryl, arylalkyl, cycloalkyl, cycloalkenyl radicals and hydrogen. (Only olefins containing at least one aryl or R'—$CH_2$— groups were found to undergo olefin-metathesis reactions. By way of further explanation, if all four of $R_1$, $R_2$, $R_3$ and $R_4$ were substituted by hydrogen or radicals where secondary or tertiary carbon atoms were directly attached to the carbon atoms in the above formula, no olefin-metathesis would occur.)

Therefore, the scope of the olefin-metathesis process comprises a chemical reaction whereby one or more unsaturated reactants corresponding to the general formula:

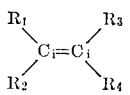

wherein (1) $C_i$ denotes the carbons which constitute the double bonds; (2) $R_1$, $R_2$, $R_3$, and $R_4$ may be at least one member of the group consisting of alkyl, aryl, alkenyl, alkaryl, arylalkyl, cycloalkyl, cycloalkenyl radicals and hydrogen; and (3) at least one of the said $R_1$, $R_2$, $R_3$, and $R_4$ is a member of the group consisting of (A) aryl and (B) R'—$CH_2$ wherein R' may be at least one member of the group consisting of alkyl, aryl, alkenyl, alkaryl, arylalkyl, cycloalkyl, cycloalkenyl radicals and hydrogen, undergo an interchange process leading to the formation of one or more unsaturated products corresponding to the formula:

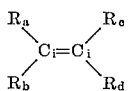

wherein (1) the number of hydrogen substituents attached to any given $C_i$ carbon in the products is equal to the number of hydrogen substituents attached to the same $C_i$ carbon in ahe reactants; (2) $R_a$, $R_b$, $R_c$ and $R_d$ substituent groups of the products must be selected from the group consisting of $R_1$, $R_2$, $R_3$ and $R_4$ substituent groups of the reactants; and (3) at least one of the said $R_a$, $R_b$, $R_c$ and $R_d$ is a group other than hydrogen.

Compounds which possess only one aryl or

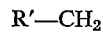

group, i.e., simple alpha-olefins, will participate only in cross-methathesis in the presence of other unsaturated compounds. Alpha-olefins will tend to polymerize rather than undergo a homo-methathesis. Representative members of this group are propylene, butene-1, pentene-1 styrene, 1,4-hexadiene,, vinyl cyclohexene, allylbenzene, vinyl toluene and the like.

Terminal olefins in which $R_1$ and $R_2$, situated on the same carbon, are aryl or R'—$CM_2$— groups so that $R_1=R_2$, will also participate only in cross-metathesis. Isobutylene and 1,1-diphenyl ethylene are representative of this group.

Terminal olefins in which $R_1$ and $R_2$, situated on the same carbon, are different than hydrogen and are dissimilar so that $R_1 \neq R_2$, will participate in homo- as well as cross-metathesis. A representative example of of this category is alpha-methyl styrene.

The three categories of compounds described heretofore consist of olefinic materials with terminal double bonds. These compounds may undergo considerable polymerization as a major side reaction in addition to the olefin-methathesis under the influence of the catalyst which will be fully described later. Internal olefins are free from the polymerization side reaction.

Compounds with two identical R groups of the aryl or R'—$CH_2$— types situated each on a different carbon of the double bond so that $R_1=R_3$ may undergo homo- or cross-methathesis. However, in the homo-metathesis only a cis-trans- isomerization will result from the reaction. Representative members of this groups are butene-2, hexene-3, octene-4, stilbene, and the like.

Compounds that possess two or more R groups of the aryl or R'—$CH_2$ types and at least two are dissimilar and situated on different carbons may undergo homo- and cross-metathesis. Representative members of this group are n-pentene-2, n-hexene-2, n-heptene-2, n-heptene-3, n-octene-2, n-octene-3 and the like; also n-alkyl butene-2 such as 2-ethyl butene-2, 2-n-propyl butene-2, 2-isobutyl butene-2 and the like; also 2-alkenyl butene-2 such as 3-methyl-2,4-heptadiene and the like; also 2-aryl butene-2 such as 2-phenyl butene-2 and the like; also 2-cycloalkyl butene-2 such as 2-cyclohexyl butene-2 and the like; also 2-cycloalkenyl butene-2 such as 2-cyclohexenyl butene-2 and the like; also 2-aralkyl butene-2 such as 2-benzyl butene-2 and the like; also 2-alkaryl butene-2 such as 2-tolyl butene-2. Similar alkyl, alkenyl, aryl, cycloalkyl, cycloalkenyl, arylalkyl, and alkaryl derivatives of pentene-2 such as 2-methyl pentene-2, 4-methyl-3,5-octadiene, 2-phenyl pentene-2, 2-cyclohexyl pentene-2, 2-cyclohexenyl pentene-2, 2-benzyl pentene-2, and 2-tolyl pentene-2. Similar derivatives of the hexenes, octenes, and higher olefins are also representative of this group.

Trisubstituted and tetrasubstituted internal olefins with all the substituents identical or of the aryl or R'—$CH_2$— types, such as methyl butene-2 or tetramethyl ethylene, will participate in cross-metathesis.

The olefin-metathesis process of this invention can be carried out over a wide temperature range from about —100° C. and lower to about 200° C. and higher, but generally temperatures in about the —70° C. to 70° C. range are suitable, with about —20° C. to about 50° C. being more suitable, for this reaction. These reactions proceed rapidly at room temperature. An outstanding feature provided by the present invention is a novel process for changing the size of the carbon skeleton of hydrocarbon species under extremely mild temperature and pressure conditions, bearing in mind that all available catalytic processes presently employed in changing the number of carbon atoms in the carbon skeleton of hydrocarbon compounds involve high temperatures and pressures such as in cracking and pyrolysis processes.

In carrying out olefin-methathesis reactions, pressures under one atmosphere or higher than one atmosphere can be employed. We have found, however, that the reaction pressure can conveniently be set at about 1 atmosphere. When gaseous material is involved in the reaction it is advisable to employ some pressure in order to ensure supply of reactant from the gas phase to the liquid phase where the catalyst is present.

The catalyst employed in the olefin-metathesis reaction of this invention is a catalyst comprising (A) at least one organo-metallic compound wherein the metal is selected from the group consisting of Ia, IIa, IIb, and IIIa groups of the Periodic Table of Elements, (B) at least one metal salt wherein the metal is selected from the group consisting of molybdenum and tungsten, and (C) at least one compound of the general formula R—Y—H wherein Y is selected from the group of oxygen and sulfur and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl, and thioalkaryl, (8) when Y is O, R is alkoxy, arylolkoxy, and alkaryloxy, and radicals of (2) through (6) wherein at least one hydrogen is substituted by a material selected from hydroxyl (OH) and thiol (SH) groups. The Perodic Table of Elements referred to may be found in the Handbook of Chemistry and Physics, 44th Edition, April 1962 reprint, published by the Chemical Rubber Publication Company, Cleveland, Ohio, U.S.A., page 448.

Representative examples of metals from which the organometallic compound, the first or (A) component of the catalyst system of this invention, can be derived are lithium, sodium, potassium, rubidium, cesium, beryllium, magnesium, calcium, strontium, barium, zinc, cadminum aluminum, gallium, indium and thallium. The preferred organo-metallic compounds are compounds of lithium, sodium, magnesium, aluminum, zinc and cadmium with aluminum being most preferred.

Representative examples of organo-metallic compounds useful as the first or (A) catalyst component of this invention are aluminum compounds having at least one aluminum-to-carbon bond. Representative of such compounds are trialkylaluminums such as trimethylaluminum, triethylaluminum, tri-n-propylaluminum, tri-n-butylaluminum, triisopropylaluminum, triisobutylaluminum, trihexylaluminum, trioctylaluminum and the like; triarylaluminums such as tritolylaluminum, tribenzylaluminum, triphenylaluminum and the like; dialkylaluminum halides such as diethylaluminum chloride, di-n-propylaluminum chloride, diisobutylaluminum chloride, diethylaluminum bromide, diethylaluminum iodide and diethylaluminum fluoride and the like; mixtures of dialkyl aluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide and the like; dialkylaluminum hydrides such as diethylaluminum hydride, di-n-propylaluminum hydride, diisobutylaluminum hydride and the like; arylaluminum hydrides and dihydrides such as diphenylaluminum hydride and phenylaluminum dihydride; the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide and the like. Other organometallic compounds are also useful in the practice of this invention. Representative of such organo-metallic compounds are organoalkali metal compounds such as alkyllithium compounds as ethyllithium, n-butyllithium, t-butyllithium, and the like; lithium-aluminum-tetraalkyls such as lithium-aluminum-tetrabutyl, lithium-aluminum-tetraethyl and the like; alkali metalalkyls and aryls such as amylsodium, butylpotassium, phenylpotassium, phenylsodium, phenyllithium, butyllithium and the like; magnesium alkyls and aryls such as diphenylmagnesium, diethylmagnesium, ethylmagnesium chloride, phenylmagnesium chloride, butylmagnesium bromide and the like; calcium, strontium and barium organo compounds such as barium alkyls and aryls; alkyls and aryls of Group IIb metals such as diethylzinc, diphenylzinc, ethylzinc chloride, diethylcadmium, dibutylcadmium and the like; Grignard agents such as phenylmagnesium bromide may also be employed. Mixtures of these compounds may be employed as the first or (A) catalyst component in the catalyst of this invention. It is usually preferred to employ aluminum compounds such as trialkylaluminums, dialkylaluminum halides, alkylaluminum dihalides and aluminumsesquihalides.

The metal salts employed in the catalyst of this invention as the second or (B) catalyst component are selected from the salts of molybdenum and tungsten. Representatives of such salts include halides such as chlorides, bromides, iodides, and fluorides, which include compounds such as molybdenum pentachloride, tungsten hexachloride, molybdenum pentabromide, tungsten hexabromide, molybdenum pentaiodide, tungsten hexaiodide, molybdenum pentafluoride, molybdenum hexafluoride, and tungsten hexafluoride. Other representative salts are those of acetyl-acetonates, sulphates, phosphates, nitrates and the like which include compounds such as molybdenum phosphate, tungsten phosphate, molybdenum nitrate, tungsten nitrate, molybdenum acetylacetonate, tungsten acetylacetonate, molybdenum sulphate, and tungsten sulphate. Mixtures of these salts may also be employed. Of these, it is usually preferred to employ tungsten halides and molybdenum halides representative of which are tungsten hexachloride and molybdenum pentachloride.

The third or (C) component of the catalyst system of this invention are compounds which respond to the formula R—Y—H wherein Y is selected from the group consisting of oxygen and sulfur and R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl, and thioalkaryl, (8) when Y is 0, R is alkoxy, arylalkoxy, and alkaryloxy, and (9) radicals of (2) through (6) wherein at least one hydrogen of R is substituted by at least one hydroxyl (OH) or thiol (SH) group.

Thus, the formula above defines a number of types of compounds. It defines water (HOH), hydrogen sulfide (HSH), both saturated and unsaturated alcohols (ROH), mercaptans (RSH), hydroperoxides (ROOH), hydrodisulfides (RSSH), polyalcohols (HOROH), polymercaptans (HSRSH), and hydroxy mercaptans (HSROH) or thioalcohols (HORSH). Representative examples of the materials responding to the formula above are alcohols representative of which are methanol, ethanol, isopropanol, tertiarybutyl alcohol, amyl alcohol, benzyl alcohol, allyl alcohol, 1,1-dimethyl benzyl alcohol, phenol, tertiarybutyl catechol, alpha and beta naphthyl alcohol; mercaptans such as methyl, ethyl, propyl, isopropyl, butyl, amyl, and similar mercaptans, allyl mercaptan, thiophenol, 4-mercaptophenol; the hydroperoxides such as cumyl hydroperoxide, tertiarybutyl hydroperoxide; the hydrodisulfides such as cumyl hydrodisulfide, t-butyl hydrodisulfide; the polyalcohols such as ethylene glycol, glycerol, and similar polyglycols; catechol, resorcinol, hydroquinone, pyrogallol; the polymercaptans such as 1,3-propane dithiol, 1,4-dithiobenzene; the hydroxymercaptans or thioalcohols such as ethane-2-ol-1-thiol, 1-hydroxy-4-thiobenzene.

One of the unusual and distinguishing features of this invention is that the compounds of the formula R—Y—H, wherein R and Y have been previously defined, depending on the particular olefin employed, the particular organo-metallic compound and the particular Group VIb metal salt chosen and on the particular R—Y—H compound chosen, when employed in fairly substantial amounts are known to reduce drastically the activity of the olefin-metathesis reaction of this invention. An unexpected high activity of the catalyst of the present invention was found when compounds of the R—Y—H type were employed in relatively small amounts and added according to the teachings set forth in the present specification and examples. Since the instant invention contemplates the use of organo-metallic compounds in combination with transition metal salts and various oxygen and sulfur-containing compounds, and since various factors or considerations will influence the optimum range of the three catalyst components in relation to each other, the molar ratios of the three components which optimize the reaction conditions cannot be readily set forth. However, by following the various teachings found in the examples of this application those skilled in the art can readily determine the optimum molar ratio of the three catalyst components to each other. Obviously if one employs the oxygen or sulfur-containing compound, or as is designated above, component C in relatively large amounts, the activity of the catalyst will be reduced considerably or even destroyed.

It has been found that good results are obtained in the practice of this invention when the molar relationship between the three catalyst components, A, B, and C as previously defined, are within a molar ratio of B/C ranging from about 0.3/1 to at least about 20/1 and the molar ratio of A/B is within the range of about 0.5/1 to at least 15/1. More preferred ratios are B/C of 0.5/1 to 5/1 and A/B of 0.5/1 to 8/1. Still more preferred ratios are B/C of 1/1 to 2/1 and A/B of 0.75/1 to 5/1.

The catalysts employed in this invention are prepared by mixing the components by known techniques. Thus, the catalysts may be prepared by "preformed" or "in situ" techniques. By the "preformed" method the catalyst components are mixed together prior to exposure of any of the catalyst components to the unsaturated compound to be used in the olefin-metathesis reaction. In the "in situ" method the catalyst components are added separately to the unsaturated compound to be used in the olefin-metathesis reaction. The catalyst components may be mixed either as pure compounds or as suspensions or solutions in liquids which do not adversely affect catalyst activity or the olefin-metathesis reaction. Representative of such liquids are saturated hydrocarbons such as hexane, pentane, and the like or aromatics such as benzene, toluene and the like.

While the presence of the olefin is not essential during the formation of active catalyst by a mixing of components A, B, and C and this fact facilitates the use of "preformed" catalysts, it has been found that freshly preformed catalysts are generally more active than catalysts which have been allowed to age before use.

The order of addition of the three catalyst components to each other is of interest in the practice of this invention. There are various methods in which the three catalyst components can be brought into contact with the olefin or olefin/solvent mixture. The following is a numerical listing of these various methods in which A, B, and C stand for the catalyst components as previously defined:

(1) Simultaneous addition of A, B and C.
(2) C followed by A and B which were previously preformed.
(3) A and B preformed followed by C.
(4) A followed by B and C which were preformed.
(5) B and C preformed followed by A.
(6) B followed by A and C which were preformed.
(7) A and C preformed followed by B.
(8) A followed by B followed by C.
(9) B followed by A followed by C.
(10) C followed by B followed by A.
(11) C followed by A followed by B.
(12) B followed by C followed by A.
(13) A followed by C followed by B.
(14) Preformed A, B, and C which was prepared by adding A to B and C preformed.
(15) Preformed A, B, and C which was prepared by adding B to A and C preformed.
(16) Preformed A, B, and C which was prepared by adding C to A and B preformed.

Of these various procedures, Procedures 6, 7, 11, 13, and 15 listed above are methods of preparation which reduce somewhat the catalyst activity. The remaining of the listed Procedures 1, 2, 3, 4, 5, 8, 9, 10, 12, 14, and 16 lead to the most active catalyst systems.

The amount of catalyst employed in the olefin-metathesis reaction of this invention may be varied over wide concentrations and has not been found to be critical. Of course, a catalytic amount of the catalyst must be employed. The optimum amount of catalyst depends upon a number of factors such as temperature, reactants used, purity of reactants, reaction times desired and the like. Those skilled in the art will readily determine the optimum catalytic ranges. Olefin-metathesis can be conducted wherein the amount of catalyst employed is about 0.001 part by weight of B per 100 parts by weight of the olefin or olefins employed, with components A and C adjusted to yield a desirable atomic ratio of $A/B/C$.

Still another type of catalyst system can be employed in the olefin-metathesis reaction previously described in this application. This catalyst system consists of a two-component catalyst system. This catalyst system comprises (A) at least one organo-aluminum halide selected from the group consisting of $RAlX_2$ and $R_2AlX$ wherein X is a halide such as chloride, bromide, iodide, and fluoride, and R is selected from the group of alkyl, aryl, araylalkyl, and alkaryl, and (B) at least one tungsten salt.

Thus, representative examples of the first or (A) catalyst component are aluminum compounds having at least one aluminum-to-carbon bond. Representative of such compounds are dialkylaluminum halides such as diethylaluminum chlorides, di-n-propylaluminum chloride, di-isobutylaluminum chloride, diethyl-aluminum bromide, diethylaluminum iodide and diethylaluminum fluoride and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide and the like; the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide and the like.

Representative of the tungsten salts employed as the second or (B) catalyst component include halides such as chlorides, bromides, iodides, and fluorides, which include compounds such as tungsten hexachloride, tungsten hexabromide, tungsten hexaiodide, and tungsten hexafluoride. Other representative salts are those of acetylacetonates, sulphates, phosphates, nitrates and the like which include compounds such as tungsten phosphate, tungsten nitrate, tungsten acetylacetonate and tungsten sulphate. Mixtures of these salts may also be employed. Of these, it is usually preferred to employ tungsten halides such as tungsten hexachloride and molybdenum pentachloride.

The molar relationship between the two catalyst components A and B as previously defined in this catalyst system are within a molar ratio of $A/B$ of about 0.5/1 to about 15/1 with a more preferred molar ratio of $A/B$ of about 0.5/1 to about 8/1 and a still more preferred molar ratio of $A/B$ of about 0.75/1 to about 5/1. These catalysts can be prepared by in situ or preformed techniques. No particular order of addition is required in preparing active catalysts from this species. These catalyst components may be reacted together as pure compounds or in solutions or suspensions in inert liquids. Representative of such liquids are saturated hydrocarbons such as pentane, hexane and the like or aromatic hydrocarbons such as benzene, toluene and the like.

The amount of catalyst employed in the olefin-metathesis reaction when the two-component catalyst system is employed has not been found to be critical and may range over wide concentrations. Of course, a catalytic amount of the catalyst must be employed but the optimum amount depends upon a number of factors such as temperature employed, the particular reactants employed, the purity of the reactants, the reaction times desired and the like. Olefin-metathesis reactions can be conducted wherein the amount of catalyst is about 0.001 part by weight of the (B) component per 100 parts by weight of the olefin or olefins employed with the proper mol ratio of $A/B$ being adjusted.

The operating conditions which are employed in the olefin-metathesis reactions of this invention may vary over a wide range of temperatures and pressures. One of the more outstanding features of the olefin-metathesis reaction of this invention is that it can be accomplished at extremely low temperatures such as room temperature or lower, for instance, $-100°$ C. as well as extremely high temperatures even up the degradation temperature of the olefin or the catalyst components. It has been observed that the olefin-metathesis reaction is conveniently carried out in the liquid form. Therefore, when employing any particular olefins which are gaseous in form at the temperatures employed the pressure should be sufficient to maintain the olefin as a liquid so that it can be intimately in contact with the homogeneous olefin-metathesis system. Likewise, when the olefins employed are usually a liquid at the temperature chosen, autogenous pressures can be employed. However, the pressure may then range from an extremely high pressure to pressures sufficient to keep the olefin in contact with the catalyst. On the other hand, it is possible to conduct the olefin-metathesis reaction in a gaseous or vapor phase. In such a reaction it is possible to employ the olefin as a vapor and pass it over the catalyst which may be prepared as a fixed bed. One of the outstanding advantages of the olefin-metathesis reaction of this invention is that extremely mild conditions can be employed. For instance, the olefin-metathesis can take place at temperatures considerably less than 100° C. and a very convenient temperature in which to operate is room temperature or the ambient temperature.

The olefin-metathesis reactions of this invention may be carried out in either bulk or in a solvent. If a solvent is to be used, any inert solvent may be employed. Convenient solvents are aliphatic, aromatic or cycloaliphatic hydrocarbons which do not themselves inhibit or interfere with the olefin-metathesis reaction.

11

The invention is further illustrated by reference to the following examples which are intended to be representative rather than restrictive of the scope of this invention.

EXAMPLE 1

A dried 4-ounce bottle was charged with 50 milliliters (ml.) heptene-3 (38.6% cis and 61.4% trans), which was freshly distilled over sodium wire, then placed on a warm sand bath and about 5 ml. of heptene-3 vented off. Into a solution of tungsten hexachloride ($WCl_6$) in toluene of 0.10 molar concentration, ethanol was added so that the ratio of $WCl_6/C_2H_5OH$ (component B/component C) equalled 1:1. Five ml. of said tungsten hexachloride/ethanol solution was added to the heptene-3 followed by 10 ml. of a 0.1 molar solution in pentane of ethylaluminum dichloride, giving a ratio of $A/B/C$ of 2/1/1. The mixture was shaken for 10 minutes at room temperature, then analyzed by vapor phase chromatography (VPC). In addition to the peaks corresponding to pentane, toluene and cis and trans heptene-3, four new peaks corresponding to cis and trans hexene-3 and to cis and trans octene-4 appeared. The relative amounts of hexenes to heptenes to octenes were 1 to 2 to 1.

EXAMPLES 2–5

In these examples several different olefins were subjected to the olefin-metathesis catalyst. To a 4-ounce bottle was charged 50 ml. of the particular olefin which had been freshly distilled (see Table 1). About 5 ml. of the olefin was vented off to purge the reaction bottle. To a solution of tungsten hexachloride (0.1 molar) in toluene was added sufficient ethyl alcohol to give a $WCl_6/C_2H_5OH$ molar ratio of 1/1. Five ml. of this tungsten hexachloride-ethyl alcohol solution was added to each of the metathesis bottles. This was followed by 10 ml. of a 0.1 molar solution of ethylaluminum dichloride (EADC) in pentane giving a ratio of catalyst components $A/B/C$ of 2/1/1. The mixtures of catalyst and olefins were shaken at room temperature for 10 minutes and then analyzed by vapor phase chromatography. The results are set forth in the following table. It is believed that the accuracy of the measurements is about ±3% which explains why in some cases the sum of the mol fractions does not equal 1.

TABLE 1

| Example No. | Olefin employed | Products | Mole fraction |
|---|---|---|---|
| 2 | Pentene-2 | Butene-2 | 0.249 |
| | | Pentene-2 | 0.506 |
| | | Hexene-3 | 0.247 |
| Total | | | 1.002 |
| 3 | Hexene-2 | Butene-2 | 0.231 |
| | | Hexene-2 | 0.510 |
| | | Octene-4 | 0.276 |
| Total | | | 1.017 |
| 4 | Heptene-2 | Butene-2 | 0.205 |
| | | Heptene-2 | 0.574 |
| | | Decene-5 | 0.224 |
| Total | | | 1.003 |
| 5 | Octene-2 | Butene-2 | 0.226 |
| | | Octene-2 | 0.517 |
| | | Dodecene-6 | 0.252 |
| Total | | | 0.995 |

The results in Examples 2–5 clearly demonstrate that no material is wasted through any side reactions to unaccounted products and that the olefin-metathesis reaction as described in the present invention is a clean reaction. This is in contrast to prior olefin disproportionation reactions which require extreme conditions of temperature and pressure and, thus, show a loss in efficiency due to the formation of by-products caused by these extreme conditions.

EXAMPLE 6

In this example an experiment similar to that of Example 1 was performed except that the olefin employed was 2-methyl pentene-2. After the olefin-metathesis reaction had been accomplished the materials found in the resultant mixture were 2-methyl pentene-2, 2-methyl butene-2, 3-methyl pentene-2, 3-ethyl pentene-2, 3-methyl hexene-3, and 3-ethyl hexene-3. These results indicate that the 2-methyl pentene-2 had undergone an olefin-metathesis reaction to form the products found.

EXAMPLE 7

A 5 ml. benzene solution containing 0.78 gram of cis butene-2 (mol. wt.=56) and 0.28 gram of deuterated butene-2-$d_8$ ($CD_3$—$CD$=$CD$—$CD_3$) (mol. wt.=64) was treated with 0.6 ml. solution of 0.05 molar $WCl_6/C_2H_5OH$ solution at a 1/1 molar ratio. This was followed by 0.6 ml. of 0.2 molar solution of ethylaluminum dichloride. Thus, maintaining a molar ratio of Al/W/O=4/1/1. The mixture was allowed to react for several minutes before a sample was withdrawn for mass spectroscopic analysis. The analysis revealed that a new butene-2 was formed by the olefin-metathesis reaction having a mol. wt. of 60. This corresponds to the tetra-deuterated butene-2-$d_4$: $CD_3CD$=$CHCH_3$.

An explanation of the results obtained in the last two examples seems to be required. Example 6 suggests that the metathesis of 2-methyl pentene-2 proceeds via Route 1 (hereinbefore described) whereby an intermolecular exchange of methyl and ethyl groups leads to the formation of the various products accounted for in Example 6. On the other hand, the results of Example 7 are consistent with either Route 2 or Route 3 (hereinbefore described). One may speculate that the mechanism of the olefin-metathesis is different for the branched olefins than the linear olefins. Another explanation may be the occurrence of an isomerization of the branched olefin, 2-methyl-pentene-2 by double bond migration to 4-methyl pentene-2 and cross metathesis by Route 2 between 4-methyl pentene-2 and 2-methylpentene-2 leading to the formation of the olefins which were accounted for in Example 6.

EXAMPLE 8

A 1/1 molar ratio mixture of pentene-2 and styrene was exposed to an olefin-metathesis catalyst like that of Example 1 for a period of about 10 minutes at room temperature. The following products were found in the resulting mixture: styrene, pentene-2, propylene, butene-1, butene-2, hexene-3, beta methyl styrene, and beta ethyl styrene. Some higher molecular weight components which appeared as a result of the polymerization of the styrene which were not identified were also present.

EXAMPLE 9

A 5-gram portion of stilbene (2,1-diphenyl ethylene) was dissolved in 100 ml. of dry benzene and cooled to 7° C. To this cooled solution was added a large excess of butene-2. To the mixture of stilbene and butene-2 was added 4 ml. of 0.05 molar solution of $WCl_6/C_2H_5OH$ at a 1/1 molar ratio. This was followed by 4 ml. of 0.1 molar solution of ethylaluminum dichloride. Thus, the molar ratio was Al/w/o of 2/1/1. After 5 minutes the mixture was analyzed and peaks indicating that beta methyl styrene was present were found.

EXAMPLE 10

In this experiment a series of olefin-metathesis reactions was carried out employing 10 ml. of heptene-3. The catalyst employed is set forth in the table below. The order of addition of the catalyst components was C followed by B followed by A. The products obtained in these reactions were analyzed by vapor phase chromatography. It is believed that the accuracy of the measurements is about ±3% which explains why in some cases the sum of the products does not equal 100%. Columns 2, 3, and 4 labeled A, B, and C correspond to components A, B, and C as previously defined, and are reported in mols times $10^4$.

TABLE 2

| Exp. No. | Catalyst | | | Products | | |
|---|---|---|---|---|---|---|
| | A | B | C | Hexene-3, percent | Heptene-3, percent | Octene-4, percent |
| | TIBA | WCl₆ | C₂H₅OH | | | |
| 1 | 0.5 | 2.0 | 0.0 | Trace | 98 | Trace |
| 2 | 1.0 | 2.0 | 0.0 | Trace | 96 | Trace |
| 3 | 2.0 | 2.0 | 0.0 | Trace | 102 | Trace |
| 4 | 4.0 | 2.0 | 0.0 | Trace | 101 | Trace |
| 5 | 4.0 | 2.0 | 1.0 | 13 | 72 | 14 |
| 6 | 4.0 | 2.0 | 2.0 | 17 | 62 | 22 |
| 7 | 4.0 | 2.0 | 4.0 | 15 | 71 | 14 |
| | DIBAC | WCl₆ | C₂H₅OH | | | |
| 8 | 0.5 | 2.0 | 0.0 | Trace | 100 | Trace |
| 9 | 1.0 | 2.0 | 0.0 | Trace | 101 | Trace |
| 10 | 2.0 | 2.0 | 0.0 | Trace | 97 | Trace |
| 11 | 4.0 | 2.0 | 0.0 | 8 | 80 | 10 |
| 12 | 4.0 | 2.0 | 1.0 | 26 | 52 | 20 |
| 13 | 4.0 | 2.0 | 2.0 | 20 | 56 | 24 |
| 14 | 4.0 | 2.0 | 4.0 | 25 | 51 | 22 |
| | EADC | WCl₆ | C₂H₅OH | | | |
| 15 | 0.5 | 2.0 | 0.0 | Trace | 97 | Trace |
| 16 | 1.0 | 2.0 | 0.0 | 10 | 82 | 7 |
| 17 | 2.0 | 2.0 | 0.0 | 14 | 71 | 15 |
| 18 | 4.0 | 2.0 | 0.0 | 16 | 76 | 11 |
| 19 | 4.0 | 2.0 | 1.0 | 22 | 50 | 27 |
| 20 | 4.0 | 2.0 | 2.0 | 21 | 51 | 24 |
| 21 | 4.0 | 2.0 | 4.0 | 23 | 51 | 24 |
| | EADC | WCl₆ | H₂O | | | |
| 22 | 4.0 | 2.0 | 2.0 | 16 | 67 | 15 |
| 23 | 4.0 | 2.0 | 4.0 | 20 | 58 | 19 |
| | EADA | WCl₆ | C₆H₅OH | | | |
| 24 | 4.0 | 2.0 | 2.0 | 25 | 52 | 22 |
| 25 | 4.0 | 2.0 | 4.0 | 26 | 49 | 26 |

TIBA—Triisobutylaluminum chloride.
DIBAC—Diisobutylaluminum chloride.
EADC—Ethylaluminum dichloride.

EXAMPLE 11

Two 4-ounce bottles were each charged with 10 ml. of 4-methyl pentene-2 which was freshly distilled over sodium. To one bottle an additional 10 ml. of hexene-2 was added. A catalyst combination of $WCl_6=C_2H_5OH$ in the amount of $2.0 \times 10^{-4}$ moles ($W/O=1/1$) was added to each bottle followed by $4.0 \times 10^{-4}$ moles of ethylaluminum dichloride (EADC). After 10 minutes at room temperature, both bottles were sampled and VPC analyses carried out.

The homo-metathesis of 4-methyl-pentene-2 bottle led to no products other than the starting material. The experiment where cross-metathesis of 4-methyl pentene-2 with hexene-2 was carried out led to the following new substances:

Butene-2
Octene-4
5-Methyl Heptene-3

The molar ratio of butene-2/octene-4/5-methyl heptene-3 was found to be 2/1/1, thus, confirming the following stoichiometric relationship:

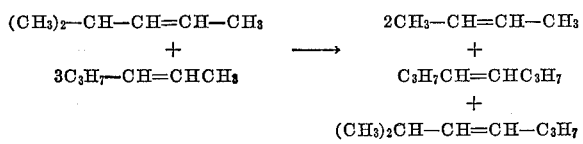

While certain representative embodiments and details have been shown for the purpose of illustrating the invention, it will be apparent to those skilled in this art that various changes and modifications may be made therein without departing from the spirit or scope of the invention.

What is claimed is:
1. The olefin metathesis method which comprises subjecting at least one hydrocarbon reactant of the general formula:

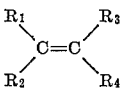

wherein $R_1$, $R_2$, $R_3$ and $R_4$ may be at least one member of the group consisting of alkyl, aryl, alkenyl, alkaryl, arylalkyl, cycloalkyl, cycloalkenyl radicals and hydrogen and at least one of said $R_1$, $R_2$, $R_3$ and $R_4$ must be at least one member of the group of aryl or R'—CH₂ wherein R' may be at least one member of the group of alkyl, aryl, alkenyl, alkaryl, arylalkyl, cycloalkyl, cycloalkenyl radicals and hydrogen, to a catalyst comprising (A) at least one organometallic compound wherein the metal is selected from the group consisting of Ia, IIa, IIb and IIIa groups of the Periodic Table of Elements, (B) at least one metal salt wherein the metal is selected from the group of molybdenum and tungsten, and (C) at least one compound of the general formula R—Y—H wherein Y is selected from the group of oxygen and sulfur and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy, and (9) radicals of (2) through (6) wherein at least one hydrogen is substituted by at least one material selected from thiol (SH) and hydroxyl (OH) groups to form at least one unsaturated product corresponding to the formula:

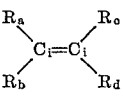

wherein: (1) the number of hydrogen substituents attached to any given $C_i$ carbon in the products is equal to the number of hydrogen substituents attached to the same $C_i$ carbon in the reactants; (2) $R_a$, $R_b$, $R_c$ and $R_d$ groups of the products must be selected from the group consisting of $R_1$, $R_2$, $R_3$ and $R_4$ of the reactants; and (3) at least one of the said $R_a$, $R_b$, $R_c$ and $R_d$ is a group other than hydrogen, said product having a higher and lower molecular weight than said starting reactant.

2. The olefin-metathesis method according to claim 1 wherein $R_1$ is a hydrogen and $R_2$, $R_3$, and $R_4$ are hydrocarbyl radicals members selected from the group consisting of alkyl, aryl, alkenyl, alkaryl, arylalkyl, cycloalkyl and cycloalkenyl radicals and at least one of the said $R_2$, $R_3$, and $R_4$ is a member selected from the group consisting of (A) aryl, and (B) R'—$CH_2$ wherein R' may be at least one member selected from the group consisting of alkyl, aryl, alkenyl, alkaryl, arylalkyl, cycloalkyl and cycloalkenyl radicals and hydrogen.

3. The olefin-metathesis method according to claim 1 wherein $R_1$ and $R_4$ are hydrogens and $R_2$ and $R_3$ are hydrocarbyl radicals members selected from the group consisting of alkyl, aryl, alkenyl, alkaryl, arylalkyl, cycloalkyl, cycloalkenyl radicals and at least one of the said $R_2$ and $R_3$ is a member selected from the group consisting of (A) aryl, and (B) R'—$CH_2$ wherein R' may be at least one member selected from the group consisting of alkyl, aryl, alkenyl, alkaryl, arylalkyl, cycloalkyl, cycloalkenyl radicals and hydrogen.

4. The olefin-metathesis method according to claim 1 in which the organometallic compound of (A) is an organoaluminum compound, the transition metal salt of (B) is a tungsten halide and the compound (C) is an alcohol.

5. The olefin-metathesis method according to claim 1 wherein $R_1$ is a hydrogen and $R_2$, $R_3$, and $R_4$ are hydrocarbyl radicals members selected from the group consisting of alkyl, aryl, alkenyl, alkaryl, arylalkyl, cycloalkyl, cycloalkenyl radicals and at least one of the said $R_2$, $R_3$, and $R_4$ is a member seected from the group consisting of (A) aryl (B) R'—$CH_2$ wherein R' may be at least one member selected from the group consisting of alkyl, aryl, alkenyl, alkaryl, arylalkyl, cycloalkyl, cycloalkenyl radicals and hydrogen, in which the organometallic compound of (A) is an organoaluminum compound, the transition metal salt of (B) is a tungsten halide and the compound (C) is an alcohol.

6. The olefin-metathesis method according to claim 1 wherein $R_1$ and $R_4$ are hydrogens and $R_2$ and $R_3$ are hydrocarbyl radicals members selected from the group consisting of alkyl, aryl, alkenyl, alkaryl, arylalkyl, cycloalkyl, cycloalkenyl radicals and at least one of the said $R_2$ and $R_3$ is a member selected from the group consisting of (A) aryl, and (B) R'—$CH_2$ wherein R' may be at least one member selected from the group consisting of alkyl, aryl, alkenyl, alkaryl, arylalkyl, cycloalkyl, cycloalkenyl radicals and hydrogen, in which the organometallic compound of (A) is an organoaluminum compound, the transition metal salt of (B) is a tungsten halide and the compound (C) is an alcohol.

7. The olefin-metathesis method according to claim 1 in which the reactants employed are in a liquid phase.

8. The olefin-metathesis method according to claim 1 in which the temperature employed does not exceed 100° C.

9. The olefin-metathesis method according to claim 1 in which the molar relationship among A, B, and C is within a molar ratio of B/C of from 0.3/1 to at least about 20/1 and the molar ratio of A/B is within the range of about 0.5/1 to at least 15/1.

10. The olefin metathesis method which comprises subjecting at least one hydrocarbon reactant of the general formula:

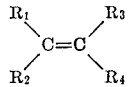

wherein $R_1$, $R_2$, $R_3$ and $R_4$ may be at least one member of the group consisting of alkyl, aryl, alkenyl, alkaryl, arylalkyl, cycloalkyl, cycloalkenyl radicals and hydrogen and at least one of said $R_1$, $R_2$, $R_3$ and $R_4$ must be at least one member of the group of aryl or R'—$CH_2$— wherein R' may be at least one member of the group of alkyl, aryl, alkenyl, alkaryl, arylalkyl, cycloalkyl, cycloalkenyl radicals and hydrogen, to a catalyst comprising (A) at least one organoaluminum halide selected from the group consisting of $RAlX_2$ and $R_2AlX$ wherein X is selected from the group consisting of chloride, bromide, iodide and fluoride radicals and R is selected from the group consisting of alkyl, aryl, arylalkyl, alkaryl and (B) at least one tungsten salt to form at least one unsaturated product corresponding to the formula:

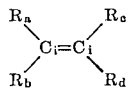

wherein: (1) the number of hydrogen substituents attached to any given $C_i$ carbon in the products is equal to the number of hydrogen substituents attached to the same $C_i$ carbon in the reactants; (2) $R_a$, $R_b$, $R_c$ and $R_d$ groups of the products must be selected from the group consisting of $R_1$, $R_2$, $R_3$ and $R_4$ of the reactants; and (3) at least one of the said $R_a$, $R_b$, $R_c$ and $R_d$ is a group other than hydrogen, said product having a higher and lower molecular weight than said starting reactant.

11. The olefin-metathesis method according to claim 10 in which the molar relationship of A and B is within a molar ratio of A/B of about 0.5/1 to about 15/1.

References Cited

UNITED STATES PATENTS

| | | |
|---|---|---|
| 3,045,001 | 7/1962 | Berger. |
| 3,151,181 | 9/1964 | Hewitt et al. |
| 3,159,614 | 12/1964 | Bloyaert. |
| 3,163,611 | 12/1964 | Andersen et al. |
| 3,261,879 | 7/1966 | Banks _____ 260—683 |

DELBERT E. GANTZ, Primary Examiner

C. E. SPRESSER, Assistant Examiner

U.S. Cl. X.R.

252—429; 260—666, 668, 669, 677, 680

UNITED STATES PATENT OFFICE
CERTIFICATE OF CORRECTION

Patent No. 3,535,401      Dated October 20, 1970

Inventor(s) Nissim Calderon and Hung Yu Chen

It is certified that error appears in the above-identified patent and that said Letters Patent are hereby corrected as shown below:

Column 1, line 34, "$C_1$" should read -- $C_i$ --.

Column 2, line 37, "olefinic" should read -- olefin --.

Column 2, equation in lines 65-69: Add under equation Roman numerals I, II and III as follows:

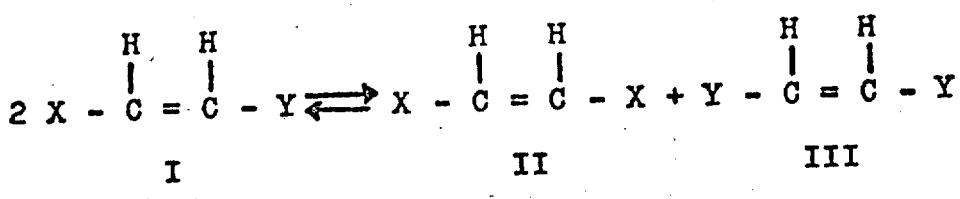

Column 3, lines 15 and 16: Present equation is:

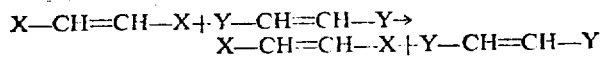

should be:

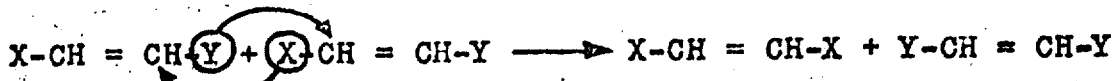

UNITED STATES PATENT OFFICE
CERTIFICATE OF CORRECTION

Patent No. 3,535,401　　　　　Dated October 20, 1970

Inventor(s) Nissim Calderon and Hung Yu Chen

It is certified that error appears in the above-identified patent and that said Letters Patent are hereby corrected as shown below:

PAGE 2

Column 3, lines 46-50: Present equation is:

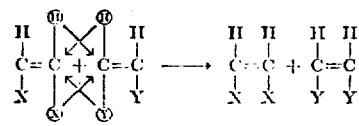

should read:

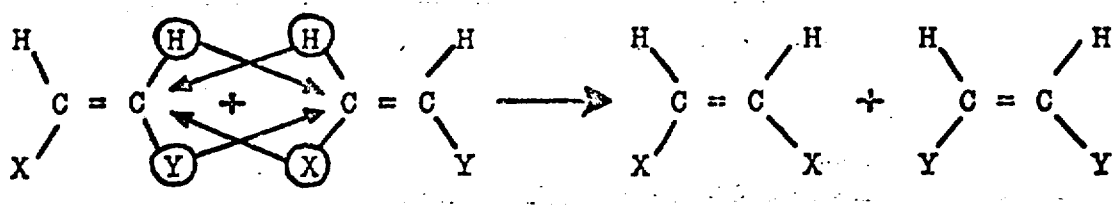

Column 4, line 18, "IV. X-CH=CH-B" should read:

-- IV. B-CH=CH-B --.

Column 5, line 14, "ahe" should read -- the --.

Column 5, line 31, "R'-CM$_2$" should read -- R'-CH$_2$- --.

Column 6, line 2, "or" should read -- and/or --.

UNITED STATES PATENT OFFICE
CERTIFICATE OF CORRECTION

Patent No. 3,535,401      Dated October 20, 1970

Inventor(s) Nissim Calderon and Hung Yu Chen

It is certified that error appears in the above-identified patent and that said Letters Patent are hereby corrected as shown below:

PAGE 3

Column 6, line 42, "arylalkoxy" is misspelled.

Column 8, line 7, after "nol," insert -- 4-methylthiophenol --.

Column 12, line 52, "(2,1-diphenyl ethylene)" should read -- (1,2-diphenyl ethylene) --.

Column 12, line 59, "Al/w/o" should read -- Al/W/O --.

Column 13, line 45: the formula "$WCl_6=C_2H_5OH$"

should read: -- $WCl_6/C_2H_5OH$ --.

Column 13, line 45 and
Column 13, line 60, "5-Methyl Heptene-3" should read

-- 2-Methyl Heptene-3 --.

Column 14, line 45 and
Column 16, line 13, the equation shown as:

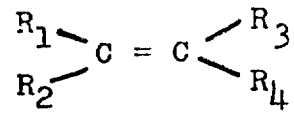

should read:

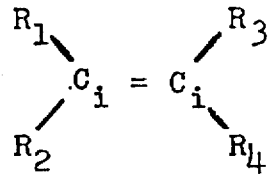

SIGNED AND SEALED
MAR 9 1971

(SEAL)
Attest:

Edward M. Fletcher, Jr.
Attesting Officer

WILLIAM E. SCHUYLER, JR.
Commissioner of Patents